Oct. 4, 1932. T. F. BRACKETT 1,880,750
FRICTION BRAKE
Filed Feb. 4, 1929
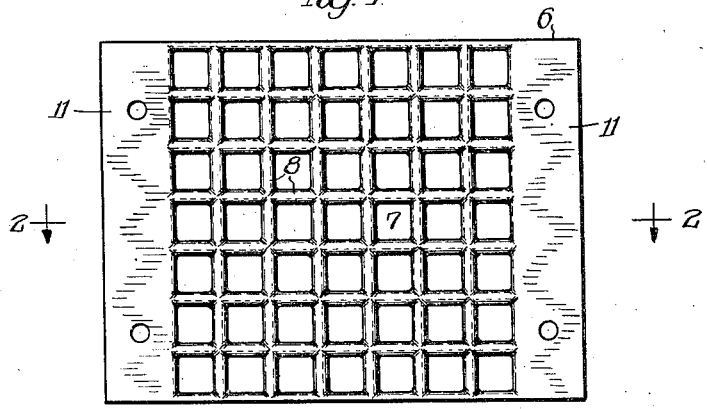
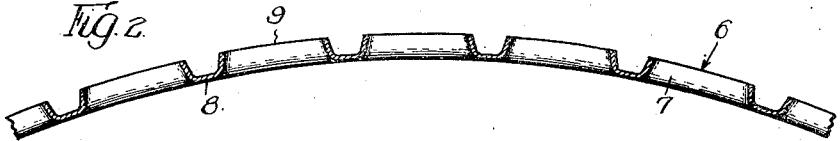
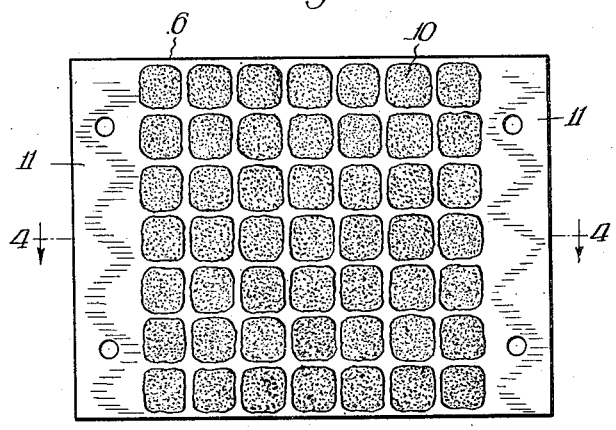
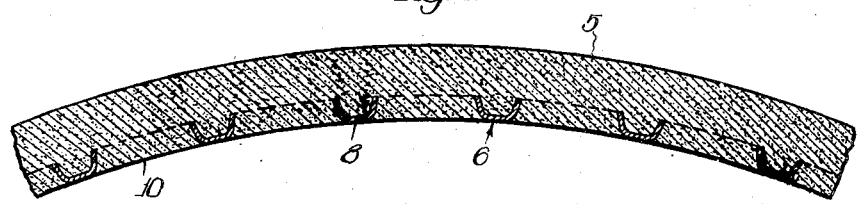
Inventor:
Tracy F. Brackett,
By Wm. O. Belt atty.

Patented Oct. 4, 1932

1,880,750

UNITED STATES PATENT OFFICE

TRACY F. BRACKETT, OF NEW YORK, N. Y., ASSIGNOR TO AMERICAN BRAKE MATERIALS CORPORATION, OF NEW YORK, N. Y., A CORPORATION OF NEW YORK

FRICTION BRAKE

Application filed February 4, 1929. Serial No. 337,201.

This invention relates to friction brakes and more particularly to friction blocks having a composition body mounted on a metal back and adapted for use on brake bands, shoes or heads, or other supports in friction brake assemblies of this kind.

The primary object of the invention is to provide a secure anchorage between the body and the back of the block to prevent the body from being sheared or otherwise separated from the back under the conditions of use.

And a further object of the invention is to provide the metal back with openings to receive the body material and having the edges of the openings formed in a novel manner to permit molding of the body on the back and in said openings and to produce a button anchorage between the body and the back.

In the accompanying drawing I have shown a selected embodiment of the invention and referring thereto Fig. 1 is a plan view of the outer side of a metal back embodying the invention.

Fig. 2 is a sectional view on the line 2—2 of Fig. 1.

Fig. 3 is a plan view of the back of a block embodying the invention.

Fig. 4 is a sectional view on the line 4—4 of Fig. 3.

Referring to the drawing the block comprises a body 5 preferably made of a suitable composition which will give desired braking effect and also possess long wearing quality. The body is mounted on a metal back 6 which is provided with openings 7 to receive the body material for anchoring the body to the back. The block is made arcuate to fit brake bands, shoes or heads, but it may be made flat and in any particular shape for friction engagement with a part to be braked. I prefer to make the openings 7 rectangular in form with opposite edges thereof transverse to the length of the back. The openings are formed by stamping and at the same time the cross bars 8 which form the openings are shaped in the form of channels substantially arcuate in cross section to provide inturned flanges 9 surrounding the openings and inclining inwardly at an angle of about ten degrees.

In practice the block may be made by placing a stamped back in a mold with the flanges 9 uppermost, depositing the required quantity of composition on the back, and then applying pressure upon the composition mass to mold it into a block with portions 10 located in the openings 9 and buttoned therein. This button effect is produced by reason of the inward inclination of the flange forming the walls of the openings so that the openings are larger in area at their outer ends than at their inner ends and, consequently, that portion of the body seated in an opening is larger at the outer end than it is at the inner end of the opening. This construction provides an effective anchorage of the body to the metal back and it enables the anchorage to be efficiently and uniformly produced in all the openings of the back and regularly in all backs during the molding operation. I have found that by inclining the flange forming the side walls of the opening 10 slightly inwardly it will not prevent the body material from being pressed into the opening to completely fill the opening so that a solid integral button is formed in each opening completely filling the opening and anchoring the body to the back. The channel cross bars are substantially arcuate or U-shaped in cross section and this increases the area of the openings without correspondingly decreasing the strength of the cross bars. In fact bending the cross bars in or about the manner shown and described increases their strength while reducing their cross section so that the back as shown in Fig. 1 is stronger with the arcuate cross bars than it would be if the cross bars were flat and at the same time the openings 7 are much larger with the arcuate cross bars than they would be with the cross bars flat and hence there is a greater area of body material employed in the anchoring of the body to the back than would be the case if the cross bars were flat, whereby the body is more securely anchored to the back. I have shown the invention embodied in a block as a complete unit with ends 11 of the back projecting beyond the body for fastening the block to its support; but the invention may be embodied in blocks made in strip form, the blocks being arranged end to end and connected together in a strip for use singly or in such combinations as may be desired.

The invention provides a simple but efficient means whereby the composition body of a brake block may be anchored to its metal back in a strong, solid and efficient manner to prevent the body from being torn or pulled away from the back with a shearing action under the strains of service. I prefer to make the openings substantially rectangular in shape because they can be disposed in parallel rows extending lengthwise and transversely of the back so that opposite transverse side walls of the openings afford efficient resistance to the strains of service.

Rectangular openings are superior to equally spaced circular openings because the thrust resistance extends evenly throughout the entire diameter of each opening whereas with circular openings the thrust resistance is concentrated at the crown of the opening. The edges between the crown and the sides of the circular opening present shearing angles which tend to shear the composition body and lessen the resistance of the body to separation from the back under braking pressure. The cross bars form intersecting channels into which the body composition is pressed and this also assists in resistance to thrust.

I have described the invention in a form which I consider desirable for the purposes intended but I reserve the right to make any changes therein that fall within the scope of the following claims.

I claim:

1. A friction block comprising a composition body and a metal back therefor, said back having a plurality of channel cross bars forming substantially rectangular openings filled with body material, said cross bars being substantially arcuate in cross section.

2. A sheet metal back for a composition friction block having a plurality of transversely and longitudinally extending cross bars forming substantially rectangular openings therebetween, the cross bars being bent substantially arcuate to form inwardly inclined flanges about each opening thereby strengthening the cross bars and providing openings smaller in area at their inner ends than at their outer ends.

3. A sheet metal back for a friction block having a plurality of spaced openings therein arranged in regular alignment, the parts of the back between the openings being bent substantially arcuate in cross section and forming intersecting channel-shaped cross bars.

TRACY F. BRACKETT.